(12) United States Patent
Kondo

(10) Patent No.: US 8,251,586 B2
(45) Date of Patent: Aug. 28, 2012

(54) LUBRICATING MEMBER FOR LINEAR MOTION ROLLING GUIDE UNIT AND SLIDER FOR LINEAR MOTION ROLLING GUIDE UNIT

(75) Inventor: Masatoshi Kondo, Gifu (JP)

(73) Assignee: Nippon Thompson Co., Ltd., Tokyo (JP)

( * ) Notice: Subject to any disclaimer, the term of this patent is extended or adjusted under 35 U.S.C. 154(b) by 496 days.

(21) Appl. No.: 12/496,140

(22) Filed: Jul. 1, 2009

(65) Prior Publication Data
US 2010/0002965 A1 Jan. 7, 2010

(30) Foreign Application Priority Data

Jul. 4, 2008 (JP) ................................. 2008-175870

(51) Int. Cl.
*F16C 33/10* (2006.01)
*F16N 1/00* (2006.01)
(52) U.S. Cl. ............................................. 384/13; 184/5
(58) Field of Classification Search .................... 384/13, 384/15, 43–45, 49; 184/5; 74/89.44
See application file for complete search history.

(56) References Cited

U.S. PATENT DOCUMENTS

| 6,024,490 A * | 2/2000 | Shirai ............................. 384/13 |
| 6,401,867 B1 * | 6/2002 | Michioka et al. .................. 184/5 |
| 7,556,430 B2 * | 7/2009 | Wu et al. .......................... 384/13 |
| 2008/0232724 A1 * | 9/2008 | Kuwabara et al. ............... 384/13 |

FOREIGN PATENT DOCUMENTS
JP 2007-073668 10/2008
* cited by examiner

*Primary Examiner* — James Pilkington
(74) *Attorney, Agent, or Firm* — Cozen O'Connor

(57) ABSTRACT

A lubricant can be evenly applied onto raceway faces or raceway grooves of a rail even when fixed to a horizontal, vertical, tilted, or ceiling surface. One or a plurality of embedding portions (26e) having a recess or a hole is formed in a member body (26) straddling the rail (R). An impregnation holding member (30) holding a lubricant is embedded in the embedding portion. The lubricating member supplies the impregnating lubricant onto the rail raceway faces while making contact with them. Even when the rail is fixed to a horizontal, vertical, tilted or a ceiling surface, the embedding portion of the member body straddling the rail has at least a part maintained in position at a level equal to or higher than the level of at least a part of one of the raceway sections (21a, 21b) of the rail located higher relative to the other raceway section.

3 Claims, 9 Drawing Sheets

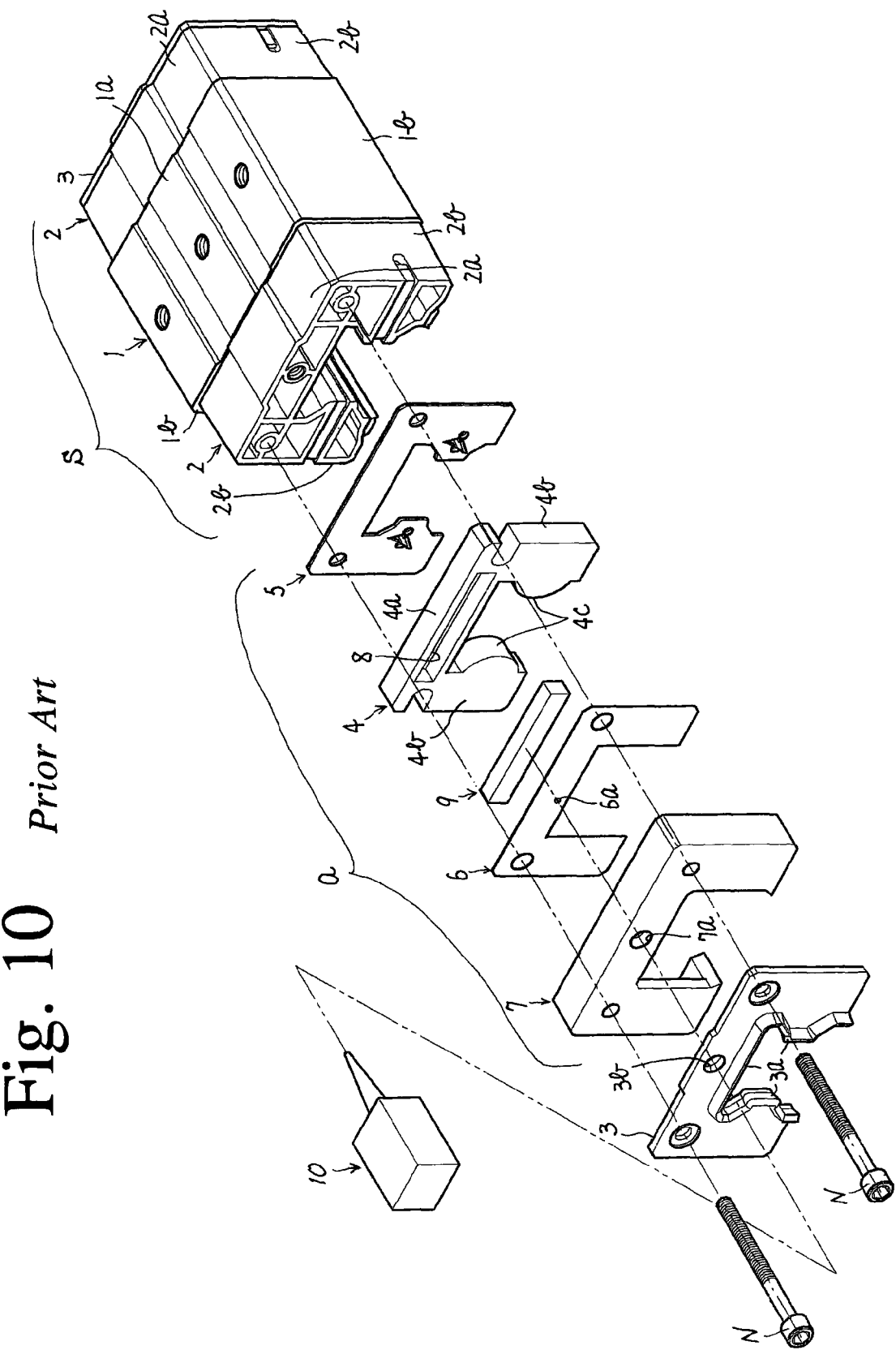
Fig. 10 *Prior Art* ized resin oil and oil in one piece or alternatively by molding a granular synthetic resin and then impregnating it with a lubricant, which is a resin-made member with fine open cells which are produced in the molding process and can hold a lubricant such as oil.

LUBRICATING MEMBER FOR LINEAR MOTION ROLLING GUIDE UNIT AND SLIDER FOR LINEAR MOTION ROLLING GUIDE UNIT

BACKGROUND OF THE INVENTION

1. Field of the Invention

This invention relates to a linear motion rolling guide unit in which a slider is moving relative to a rail.

2. Description of the Related Art

For a lubricating member and a slider used in such a type of linear motion rolling guide unit, FIG. 10 shows an example of the conventional structure, such as is disclosed in Japanese Patent Application No. 2007-073668 which has been filed by the present applicant. The conventional structure will be described below in detail with reference to FIG. 10.

FIG. 10 illustrates a casing 1 and end caps 2 which are respectively fixedly attached to the opposing ends of the casing 1. Endless circulation passages are provided inside the casing 1 and the end caps 2 for allowing a plurality of rolling elements such as rollers to endlessly circulate therein.

The casing 1 has a flat face 1a and a pair of side portions 1b which extend at right angles to the flat face 1a. As with the casing 1, each of the end caps 2 has a flat face 2a and a pair of side portions 2b which extend at right angles to the flat face 2a. In short, the entire slider S has a flat face and side portions which extend at right angles to the flat face. Endless circulation passages (not shown) are provided in the side portions to hold the rolling elements in such a way that the rolling elements can roll in the endless circulation passages.

The rolling elements are exposed on the mutually facing inner faces of the respective side portions 1b, where the rolling elements roll on the raceway faces of the rail, so that the slider S moves relative to the rail.

One of the end caps 2 (the right end cap 2 in the example in FIG. 10) has two opposing end faces, one end face making contact with the casing 1 and the other end face facing the outside. An end-face seal 3, which is a separate member from the end cap 2, is fixedly attached to this outward-facing face of the end cap 2. The end-face seal 3 comprises a lip 3a making contact with the raceway face of the rail (see the left end-face seal 3), preventing the entry of dust and the like into the slider S sliding on the rail.

Likewise, the outward-facing face of the other end cap 2 (the left end cap 2 in the example in FIG. 10) is also provided with an end-face seal 3. In this case, however, a lubricating member a is interposed between the end-face seal 3 and the end cap 2.

The lubricating member a comprises a member body 4, a plate 5 fixed to one end face of a member body 4, an oil packing 6 fixed to the other end face of the member body 4, and a case 7 housing the member body 4, the plate 5 and the oil packing 6.

The member body 4 is formed, for example, by pressurizing and molding a synthetic resin and oil in one piece or alternatively by molding a granular synthetic resin and then impregnating it with a lubricant, which is a resin-made member with fine open cells which are produced in the molding process and can hold a lubricant such as oil.

Similar to the casing 1 and the end cap 2, the member body 4 also has a coupling portion 4a and a pair of side portions 4b respectively extending out from the opposing sides of the coupling portion 4a in a direction at right angles. The side portions 4b respectively have mutually facing faces from which arc-shaped contact lubrication portions 4c respectively protrude. The contact lubricating portions 4c maintain a dimensional relationship to the rail that ensures that the contact lubricating portions 4c are in light contact with the raceway faces on the rail side faces when the slider S is straddlingly mounted on the rail.

The coupling portion 4a of the member body 4 is depressed in one face oriented in the sliding direction of the slider S to form a recessed embedding portion 8. The embedding portion 8 is formed of a rectangular cross-section recess extending between the opposing side portions 4b. An impregnation holding member 9 is embedded in the embedding portion 8.

The impregnation holding member 9 is formed of materials capable of being impregnated with a lubricant, such as a felt material. The impregnation holding member 9 has a larger oil-impregnation space per unit volume, that is, a greater amount of lubricant per unit volume than the member body 4 does.

However, it is necessary that the force sucking the lubricant into the impregnation holding member 9 is equal to or smaller than that into the member body 4. The force sucking the lubricant referred to here means the strength of sucking the lubricant into the impregnation holding member 9 or the member body 4 by capillary action or surface tension. In either case, the relationship between the sucking forces in the impregnation holding member 9 and the member body 4 is required to be a relationship such that the lubricant seeps from the impregnation holding member 9 into the member body 4.

After the impregnation holding member 9 is secured in the embedding portion 8 of the member body 4, an oil packing 6 is placed over the face of the member body 4 so as to seal the open end of the embedding portion 8. The oil packing 6 is formed in a shape approximately covering the face (facing in the sliding direction of the slider S) of the member body 4 except for the contact lubricating portion 4c. The oil packing 6 has a feed hole 6a which is a small-diameter hole formed in a position corresponding to the embedding portion 8, so that the embedding portion 8 communicates with the outside through the feed hole 6a.

The member body 4 and the oil packing 6 are mounted in the case 7. The case 7 is formed in a shape covering the outer periphery of the oil packing 6 and the member body 4. The case 7 has a through hole 7a drilled in alignment with the feed hole 6a of the oil packing 6 when the oil packing 6 is mounted in the case 7.

The plate 5 is a metallic member, which is placed on the face of the member body 4 opposite to the face on which the oil packing 6 is placed. That is, the member body 4 and the oil packing 6 are sandwiched between the case 7 and the plate 5, and all their faces, except for the mutual facing faces of the pair of side portions 4b, are covered with the case 7 and the plate 5.

The lubricating member a structured as described above is fixedly attached to the casing 1 of the slider S through screws N while the plate 5 is in contact with the end cap 2. At this stage, the end face seal 3 is simultaneously secured to the face of the case 7 which is opposite to the plate 5 secured to the end cap 2.

The end face seal 3, which is secured to the case 7, has an insertion hole 3b drilled in a position aligned with the feed hole 6a and the through hole 7a. Thus, the embedding portion 8 formed in the member body 4 communicates with the outside through the feed hole 6a of the oil packing 6, the through hole 7a of the case 7 and the insertion hole 3b of the end face seal 3.

The slider S with the lubricating member a secured to one of the end caps 2 moves relative to the rail while the contact lubricating portions 4c of the lubricating member a are in contact with the raceway faces of the rail. The lubricant impregnating the member body 4 is supplied from the contact lubricating portion 4c onto the raceway faces of the rail to lubricate the raceway faces.

As the lubricant is supplied from the contact lubricating portions 4c onto the raceway faces in this manner, the amount of the lubricant in the member body 4 gradually decreases. However, upon the decrease in the lubricant from the member body 4, the lubricant exuded from the impregnation holding member 9 gradually seeps into the member body 4.

Since the impregnation holding member 9 has a larger amount of lubricant held per unit volume than that held in the member body 4 as described earlier, although the impregnation holding member 9 has a smaller volume than the member body 4 has, the impregnation holding member 9 is capable of fully supplying the amount of lubricant consumed by the member body 4.

As additional lubricant is fed from the impregnation holding member 9 to the member body 4, the lubricant in the impregnation holding member 9 gradually decreases. However, the lubricating member a is capable of refilling the impregnation holding member 9 with lubricant as described below.

The embedding portion 8 provided in the member body 4 is linked to the outer face of the end face seal 3 through the feed hole 6a, the through hole 7a and the insertion hole 3b.

Then, an injector 10 holding liquid lubricant such as oil is inserted from the end face seal 3 such that the leading end of the injector 10 passes through the feed hole 6a. At this stage, the liquid lubricant is supplied to the impregnation holding member 9 embedded in the embedding portion 8, thereby storing up liquid lubricant in the impregnation holding member 9, which then makes it possible to feed the lubricant to the member body 4 again.

The rail slidably carrying the slider S as described above is not limited to being laid on a horizontal surface at all times. The rail may be laid on a vertical surface such as a wall or on a ceiling. For example, when the rail is fixedly attached to a vertical surface to extend horizontally, one of the side portions 1b of the slider S straddling the rail is located at a higher level and the other side portion 1b is located at a lower level. In other words, the two side portions are respectively situated in an upper position and a lower position relative to the vertical surface. If the side portions of the slider S are respectively disposed above and below in this manner, the embedding portion 8 is vertically oriented.

If the embedding portion 8 is situated in a vertical position, the lubricant filling the embedding portion 8 or the lubricant impregnating the impregnation holding member 9 unevenly accumulates in the lower-level part of the embedding portion 8. As a result, the side portion 4b located at a higher level lacks lubricant, giving rise to the impossibility of uniform lubrication. Also, when the rail is laid on a tilted surface or a ceiling, a similar situation occurs.

In addition, if lubricant is unevenly distributed as described above, this causes a shortened effective period of the lubricating capability. That is, the required amount of lubricant may become substantially insufficient within a short period.

SUMMARY OF THE INVENTION

It is an object of the present invention to provide a lubricating member intended for use in a linear motion rolling guide unit and a slider intended for use in a linear motion rolling guide unit, which are capable of applying more uniform lubrication to raceway faces or raceway grooves of a rail even when the rail is fixed to a horizontal surface, a tilted surface, a vertical surface or a ceiling, and also of maintaining the lubricating capability of the lubricating member for a long time-period.

A first aspect of the present invention is based on a lubricating member for a linear motion rolling guide unit which comprises a member body straddling a rail, an embedding portion or a plurality of embedding portions, the embedding portion or each of the embedding portions having either a recess or a hole formed in the member body, and an impregnation holding member that is embedded in the embedding portion or each of the embedding portions, is capable of being impregnated with a greater amount of lubricant per unit volume than the member body is, and has a force sucking the lubricant equal to or smaller than that of the member body, so that the impregnation holding member stores the lubricant and the lubricating member supplies the impregnating lubricant onto raceway faces of the rail while making contact with the raceway faces. The lubricating member is structured to allow, even when the rail is fixed to any surface, whether a horizontal surface, a vertical surface, a tilted surface or a ceiling surface, the embedding portion of the member body straddling the rail to have at least a part maintained in position at a level equal to or higher than a level of at least a part of one of the raceway sections of the rail which is located at a higher level relative to the other raceway section.

In the first aspect of the present invention, the member body may comprise a pair of mutually facing side portions connected to each other through a coupling portion, the side portions and the coupling portion being molded in one piece. Preferably, each of the side portions makes contact with a pair of mutually facing raceway faces of the raceway sections provided on each of opposing side faces of the rail when the member body straddles the rail. Preferably, the embedding portion is provided in each of the side portions, and maintains a length longer than the distance between the pair of mutually facing raceway faces.

In the first aspect of the present invention, the member body may comprise a pair of mutually facing side portions connected to each other through a coupling portion, the side portions and the coupling portion being molded in one piece. Preferably, a part of each of the side portions and a part of the coupling portion close to the part of the side portion make contact with a pair of raceway grooves of the raceway sections respectively provided on opposing sides of a side corner of the rail when the member body straddles the rail. Preferably, the embedding portion extends in an range from a portion of the coupling portion to a portion of the side portion, and has two ends respectively either exactly facing the pair of raceway grooves or facing portions of the rail beyond the pair of respective raceway grooves.

A second aspect of the present invention is based on a slider for a linear motion rolling guide unit, comprising a casing, a pair of end caps respectively fixed to the opposing ends of the casing, endless circulating passages provided within the casing and the end caps for holding rolling elements which allow the rolling elements to roll through the endless circulating passages, and a lubricating member mounted on either one or each of the end caps for introduction of a lubricant. The lubricating member comprises a member body, an embedding portion or a plurality of embedding portions, the embedding portion or each of the embedding portions having either a recess or a hole formed in the member body. The lubricating member further comprises an impregnation holding member that is embedded in the embedding portion, is capable of being impregnated with a greater amount of lubricant per unit volume than the member body is, and has a force sucking the lubricant equal to or smaller than that of the member body, so that the impregnation holding member is impregnated with a lubricant and the member body supplies the impregnating lubricant onto raceway sections of a rail while making contact with the raceway sections.

In the slider for the linear motion rolling guide unit, preferably, even when the rail is fixed to any surface, whether a horizontal surface, a vertical surface, a tilted surface or a ceiling surface, the embedding portion of the member body straddling the rail has at least a part maintained in a position at a level equal to or higher than a level of at least a part of one of the raceway sections of the rail which is located at a higher level relative to the other raceway section.

In the second aspect, preferably, when the impregnation holding member is embedded in the embedding portion, a gap is created between the embedding portion and the impregnation holding member to serve as an oil reservoir.

In the second aspect, preferably, a core plate having approximately the same shape as that of the member body is attached to an outer end of the end cap, and a packing plate is interposed between the core plate and the member body. Preferably, the member body is covered by a case, and an end face seal is overlaid on the outer end face of the case. Preferably, oiling ports are formed to extend through the end face seal and the case to reach the embedding portion.

According to the first aspect of the present invention, the embedding portions formed in the member body of the lubricating member always face the raceway sections of the rail irrespective of the mounting state of the rail, so that the lubricant held in each of the embedding portions is not unevenly distributed. As a result, the raceway sections are lubricated at all times, causing no problem of uneven lubrication.

If the lubricant is unevenly distributed, when the lubricant in the embedding portion is decreased evenly a small amount, the embedding portion will have an area in which the lubricant does not exist, leading to inadequate lubrication of the raceway face of the rail facing the lubricantless area of the embedding portion. To avoid this, even if some lubricant exists in the embedding portion, an additional supply of lubricant is necessary.

According to the present invention, however, because the lubricant is stored uniformly in the embedding portion, this makes it possible to maintain the effective lubricating capability of the member body for a long time without the need for frequently injecting the lubricant.

According to the second aspect of the present invention, even when the rail is fixed to any surface, whether a horizontal, vertical, tilted or ceiling surface, the embedding portion faces the rail. This allows the slider to reliably remain in its smooth sliding state all the time.

According to the present invention, because of the provision of an oil reservoir formed of the gap between the embedding portion and the impregnation holding member, the lubricant can be temporarily held in the oil reservoir and then gradually introduced into the impregnation holding member.

According to the present invention, when the lubricant is fed from the oiling ports, the lubricant is temporarily stored in the oil reservoir and then gradually introduced into the impregnation holding member. This makes it possible to complete the operation of supplying a lubricant within a short time.

BRIEF DESCRIPTION OF THE DRAWINGS

FIG. 10 is an exploded perspective view of a slider and a lubricating unit in the related art.

BEST MODE FOR CARRYING OUT THE INVENTION

Figure 1:
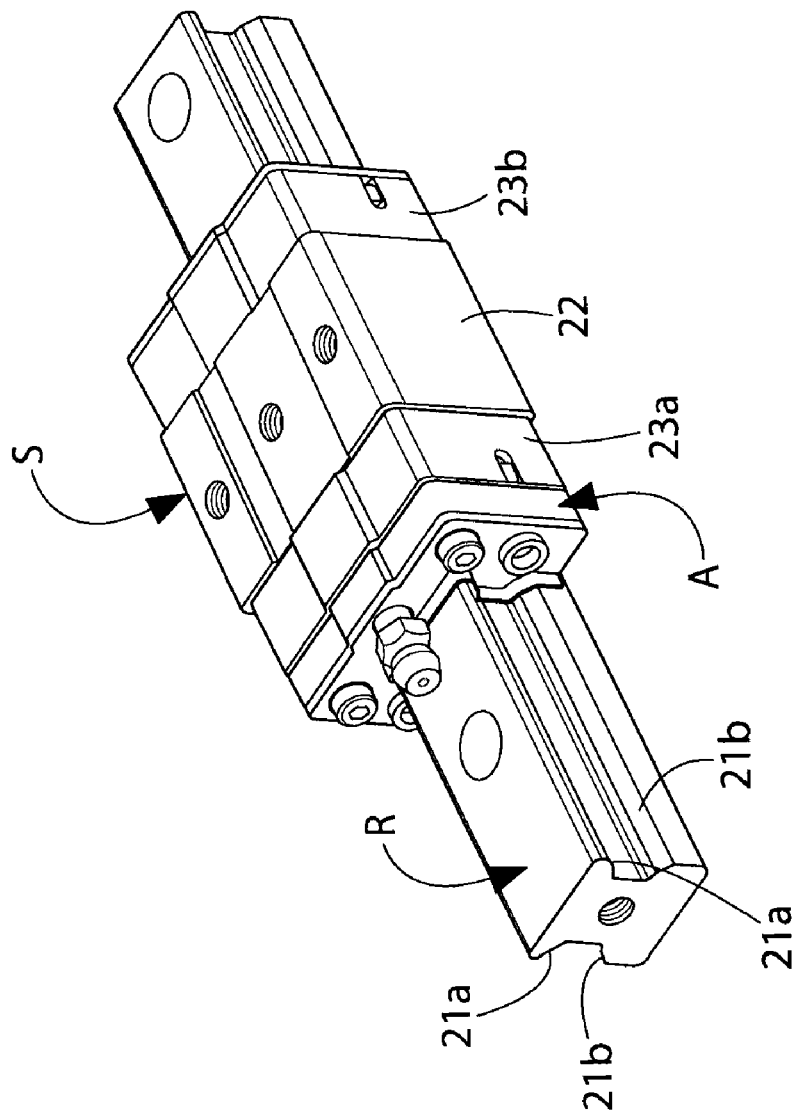
FIG. 1 is a perspective view of a slider straddling a rail.
Figure 2:
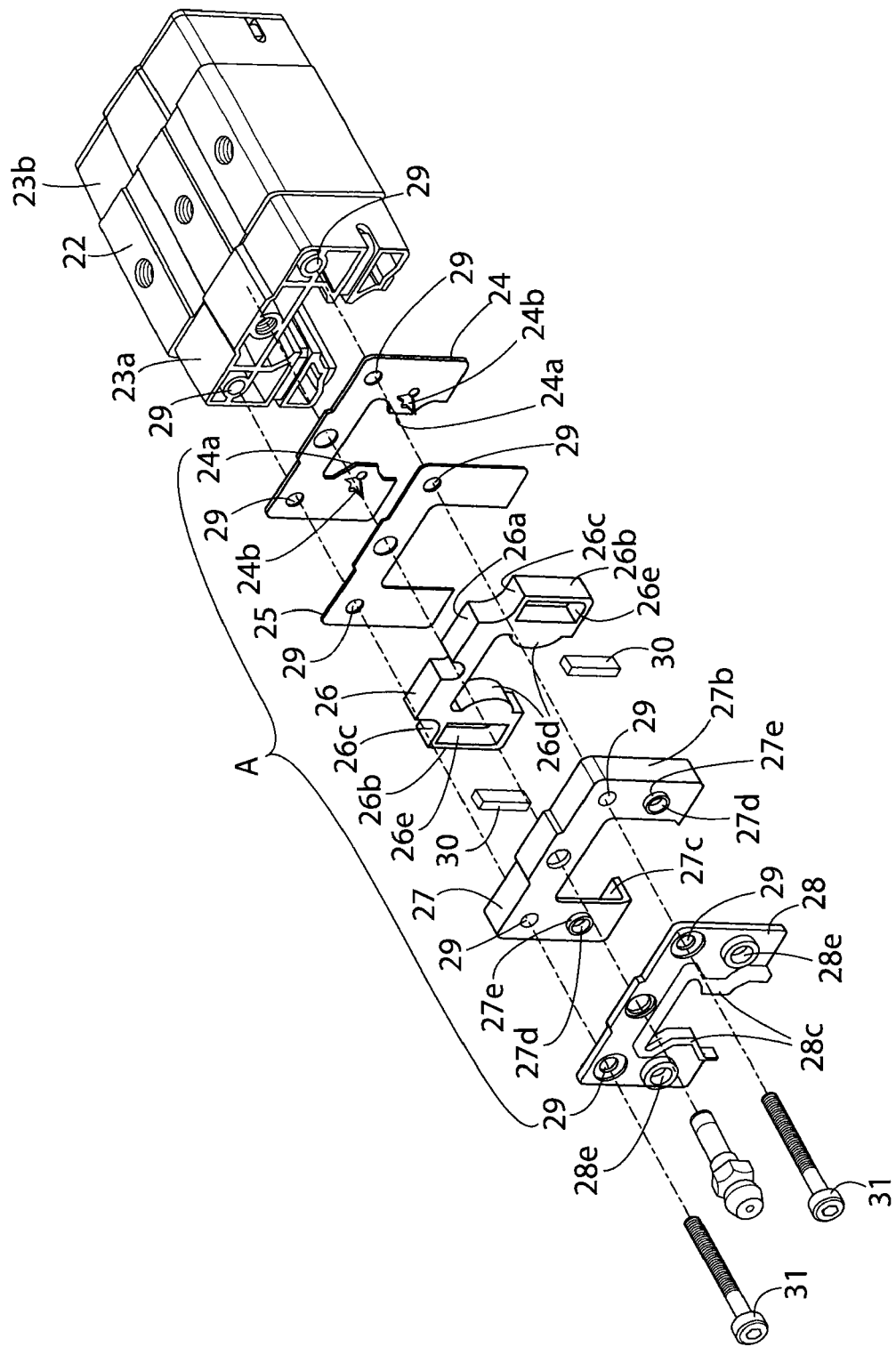
FIG. 2 is an exploded perspective view of a slider and a lubricating unit according to a first embodiment.
Figure 3:
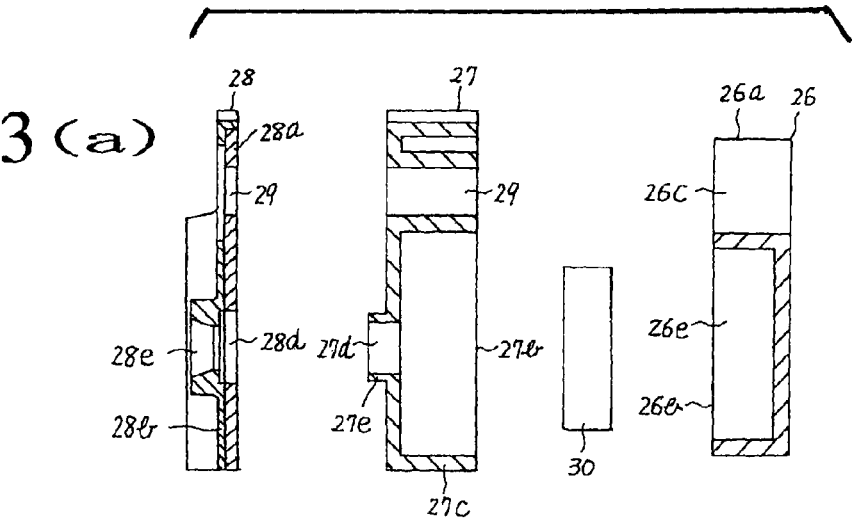
FIG. 3A is a sectional view of a member body, an impregnation holding member, a case and an end-face seal in a disassembled state.
FIG. 3B is a sectional view of the member body, the impregnation holding member, the case and the end-face seal in an assembled state.
FIG. 3C is a plan top view of the case when viewed from the member body.
Figure 3:
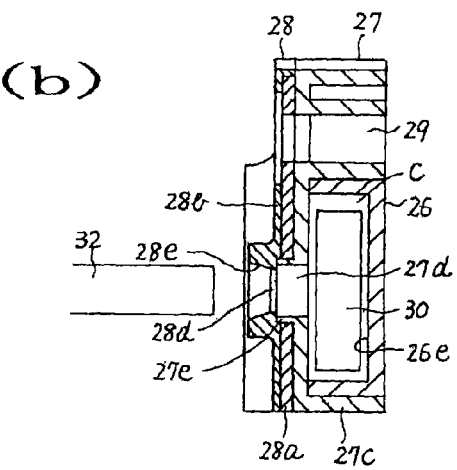
Figure 3:
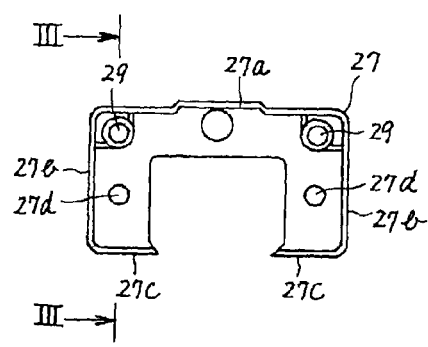

In a first embodiment illustrated in FIGS. 1 to 3, FIG. 1 is a perspective view illustrating a slider S movably straddling a rail R. The rail R is recessed in its opposing side faces to form recesses extending in the longitudinal direction. The upper and lower surfaces of each of the recesses serve as raceway faces $21a$ and $21b$ corresponding to the raceway sections of the present invention.

The slider S straddling the rail R comprises a casing 22 and end caps $23a$, $23b$ which are respectively mounted on the opposing ends of the casing 22. A lubricating member A is mounted on the outward end face of the end cap $23a$ in FIG. 1. Note that the casing 22 and the end caps $23a$, $23b$ are identical in structure with the conventional ones, each of which has a flat face and side portions extending at right angles to the flat face. Endless circulation passages are provided in the casing 22 and the end caps $23a$, $23b$ to allow a plurality of rolling elements such as rollers to roll and endlessly circulate therein.

As illustrated in FIG. 2, the lubricating member A comprises a core plate 24, a packing plate 25, a member body 26, a case 27 and an end face seal 28 which are lined up in front of the other in order from the end cap $23a$.

The core plate 24 has a pair of protrusions $24a$ which are shaped in correspondence with the inner side shape of the end cap $23a$. Each of the protrusions $24a$ is located close to the raceway faces $21a$, $21b$ when the slider S straddles the rail R. In addition, the core plate 24 has protrusions $24b$ protruding from the respective protrusions $24a$ toward the member body 26.

The packing plate 25 is formed in an inversed U shape in the sliding direction of the slider S, corresponding to the shape of the core plate 24 without the protrusions $24a$.

The member body 26 is formed, for example, by pressurizing and molding a synthetic resin and oil in one piece or alternatively by molding a granular synthetic resin and then impregnating it with a lubricant. The member body 26 is formed of materials capable of having fine open cells produced in the materials in the molding process and being impregnated with a lubricant such as oil in the fine open cells.

The outside shape of the member body 26 is approximately the same as that of the core plate 24, and has a coupling portion 26a and a pair of side portions 26b extending at right angles to the coupling portion 26b. The corner formed by the intersection of the coupling portion 26a and each of the side portions 26b is shaped into a rounded portion 26c which is aligned with the bolt holes 29 respectively drilled in the end cap 23a, the core plate 24, the packing plate 25, the case 27 and the end-face seal 28.

The protrusions 26d respectively protrude from the inner sides, that is, the mutually facing faces, of the respective side portions 26b toward the inside, which correspond to the respective protrusions 24b of the core plate 24. Accordingly, each of the protrusions 26d makes contact with the raceway faces 21a, 21b when the slider S straddles the rail R, and are pressed against the raceway faces 21a, 21b while the slider S is moving. When the protrusions 26d are pressed against the raceway faces 21a, 21b in this manner, the lubricant impregnating the member.

In addition, in each of the side portions 26b, an embedding portion 26e is formed in a rectangular groove extending in the longitudinal direction of the side portion 26b. Incidentally, the embedding portion 26e is not required to be formed in a groove shape, and may be formed as a through hole.

An impregnation holding member 30 is embedded in the embedding portion 26e provided as described above. The impregnation holding member 30 is formed of materials with higher properties of impregnation with a lubricant, such as a felt material, for example. The impregnation holding member 30 has a larger oil-impregnation space per unit volume, that is, a greater amount of lubricant held per unit volume than the member body 26 does.

It is necessary that the impregnation holding member 30 and the member body 26 have a relationship in which the force sucking the lubricant into the impregnation holding member 30 is equal to or smaller than that into the member body 26. This is because the lubricant held in the impregnation holding member 30 is required to seep from the impregnation holding member 30 into the member body 26. The force sucking the lubricant referred to here means the strength of sucking the lubricant into the impregnation holding member 30 or the member body 26 by capillary action or surface tension.

When the impregnation holding member 30 is embedded in the embedding portion 26e, a gap is created between the impregnation holding member 30 and the embedding portion 26e. This gap forms an oil reservoir c. Conceivable methods for creating a gap between the impregnation holding member 30 and the embedding portion 26e include, for example, the provision of an embedding portion 26e having a larger volume than that of the impregnation holding member 30 impregnated with a lubricant, and a change in shape between the embedding portion 26e and the impregnation holding member 30.

The case 27 has a size sufficient to receive the member body 26 of the lubricating member A fitted therein. FIG. 3C illustrates the case 27 when viewed from the member body 26. FIG. 3B is a cross section view of the case 27 taken along the III-III line in FIG. 3C.

As seen from FIGS. 3A to 3C, the case 27 has a coupling-portion wall 27a and side-portion walls 27b which are shaped in correspondence with the shape of the member body 26, and also bottom walls 27c directly extending out from the respective side-portion walls 27b. Oilholes 27d are respectively formed in the inner sides of the side-portion walls 27b, and maintain the positional alignment relationship with the embedding portion 26e of the member body 26 fitted in the case 27. Ring-shaped protrusions 27e respectively protrude around the oilholes 27d toward the end-face seal 28.

The end-face seal 28 is made up of a metal plate 28a, a rubber-made elastic material 28b which is baked around the metal plate 28a in one piece. The end-face seal 28 has a lip 28c making contact with the raceway faces 21a, 21b of the rail R, so that dust and the like cannot enter the inside of the slider S when the slider S slides on the rail R. In addition, the end-face seal 28 has oilholes 28d respectively drilled in the side portions thereof. The oilholes 28d are structured to receive the ring-shaped protrusions 27e of the case 27 as shown in FIG. 3B, respectively.

The following is the manner of assembling the core plate 24, the packing plate 25, the member body 26, the case 27 and the end face seal 28.

Initially, as illustrated in FIGS. 3A to 3C, each of the impregnation holding members 30 is mounted in the embedding portion 26e of the member body 26, and then this member body 26 is mounted in the case 27. When the impregnation holding member 30 is placed in the embedding portion 26e in this manner, a gap is created between the embedding portion 26e and the impregnation holding member 30. The gap thus created forms an oil reservoir c.

Then, the end face seal 28 is attached to the outer end face of the case 27 in which the member body 26 is fitted. At this stage, the ring-shaped protrusions 27e of the case 27 are inserted into the respective oilholes 28d of the end-face seal 28 so as to combine the case 27 and the end-face seal 28 together (see FIG. 3B). For information, FIG. 3B illustrates an oiling inlet 28e made up of a ring-shaped protrusion raised around the oilhole 28d, and the cylinder-shaped leading end of an oil injector 32 for additional oiling.

After the end-face seal 28 has been combined into one piece with the case 27 with the member body 26 mounted therein, the packing plate 25 is attached to the exposed face of the member body 26 on the opposite side to the case 27. At this stage, the core plate 24 is pressed against the member body 26 such that the packing plate 25 is sandwiched between the member body 26 and the core plate 24. When the core plate 24 is pressed against the member body 26 in this way, the protrusions 24b of the core plate 24 are respectively thrust into the protrusions 26d of the member body 26, so that the member body 26 is situated in a position to make desirable contact with the raceway faces 21a, 21b.

At the last stage, fixing bolts 31 are inserted through the bolt holes 29 in order to fixedly attach the lubricating member A to the casing 22.

Note that the outer face of the end cap 23b of the slider S is covered with an end-face seal similar to the end-face seal 28.

Figure 4:
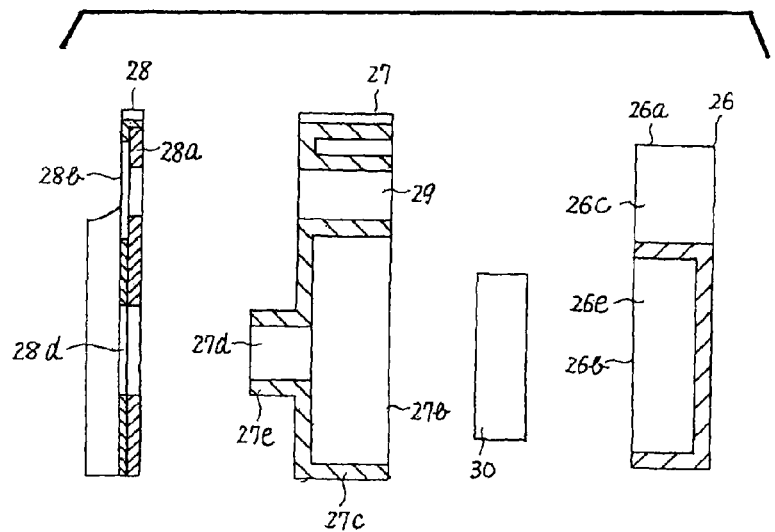
FIG. 4A is a sectional view of a member body, an impregnation holding member, a case and an end-face seal when disassembled according to a second embodiment.
FIG. 4B is a sectional view of the member body, the impregnation holding member, the case and the end-face seal when assembled.
Figure 4:
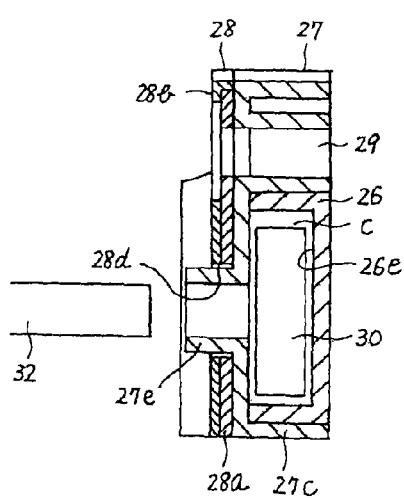

FIGS. 4A and 4B illustrate a second embodiment according to the present invention, in which each of the ring-shaped protrusions 27e formed on the case 27 is long enough to permit the ring-shaped protrusion 27e to protrude from the oilhole 28d to serve as the oiling inlet when the end-face seal 28 is attached to the outer end face of the case 27, but the structure of the other components is the same as that in the first embodiment.

Figure 5:
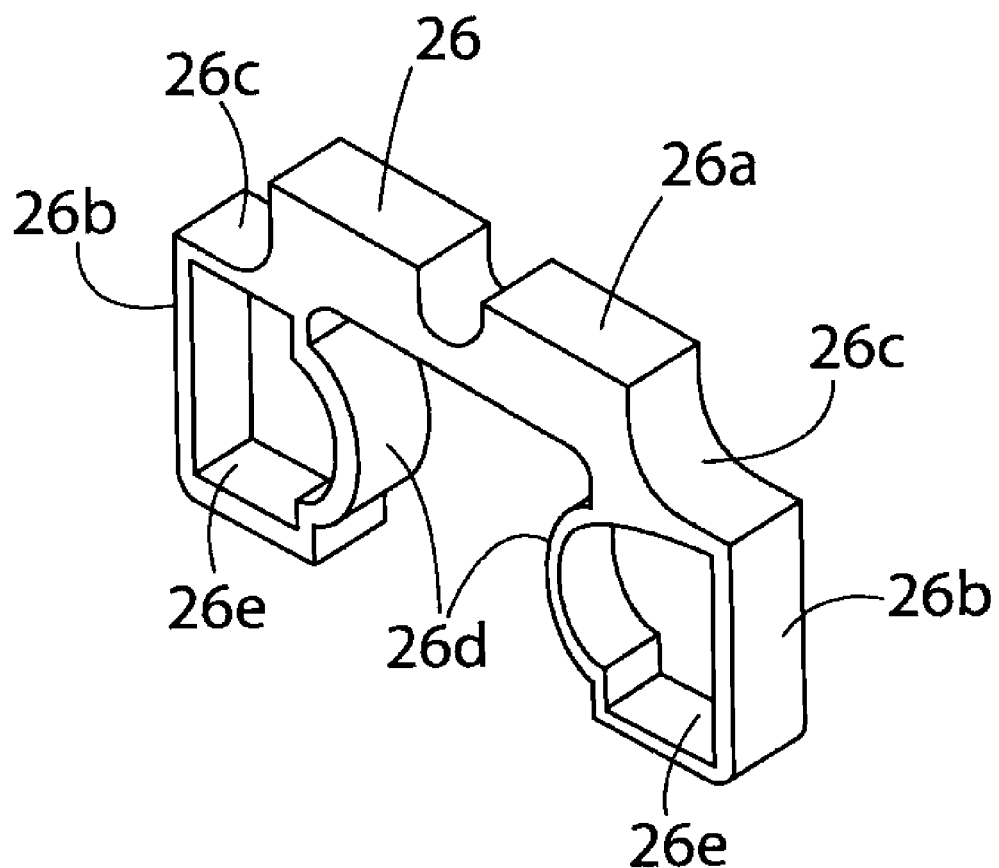
FIG. 5 is a perspective view of a lubricating member of a third embodiment.
Figure 6:
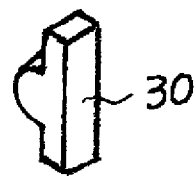
FIG. 6 is a perspective view of an impregnation holding member of the third embodiment.

FIGS. 5 and 6 illustrate a third embodiment of the present invention, in which each of the embedding portions 26e provided in the member body 26 is shaped to expand toward the protrusion 26d and correspondingly the impregnation holding member 30 is also formed in approximately the same shape as this embedding portion 26e. Note that an oil reservoir c is also created between the embedding portion 26e and the impregnation holding member in the third embodiment as in the case of the first embodiment.

The third embodiment increases the volume of the impregnation holding member 30, thus making it possible to increase the amount of lubricant introduced in an additional oiling process.

Figure 7:
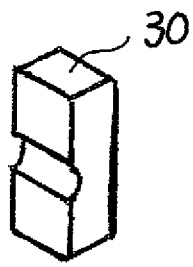
FIG. 7 is a perspective view of an impregnation holding member of a fourth embodiment.

Alternatively, an impregnation holding member 30 of the same shape as that in the first embodiment may be mounted in the embedding portion 26e of the member body 26 shown in FIG. 5. In this case, the oil reservoir c is increased in volume. Alternatively, FIG. 7 illustrates a fourth embodiment, in which the impregnation holding member 30 can be mounted in the embedding portion 26e shown in FIG. 5. The impregnation holding member 30 as shown in FIG. 7 has a recess formed in a position corresponding to the position of the oilhole 27d.

For injection of the lubricant into the lubricating member A thus assembled, for example, the oil injector 32 is slipped into the oiling inlet 28e. At this stage, because of the oil reservoir c created as described earlier, the lubricant injected from the oil injector 32 temporarily accumulates in the oil reservoir c, and then is gradually absorbed into the impregnation holding member 30 from the oil reservoir c. As a result of providing the oil reservoir c for temporarily storing the lubricant in this manner, the time required for the oiling process is shortened.

The combination of the oilholes 27d and 28d forms the oiling port of the present invention.

The recess formed in the impregnation holding member 30 illustrated in FIG. 7 is shaped to conform to the injecting tube of the oil injector 32. In this case, accordingly, the lubricant can be more smoothly supplied to the oil reservoir c.

In each of the aforementioned embodiments, since the member body 26 is perfectly sealed by the case 27 and the packing plate 24, the lubricant impregnating the member body 26 does not leak to the outside.

Figure 8:
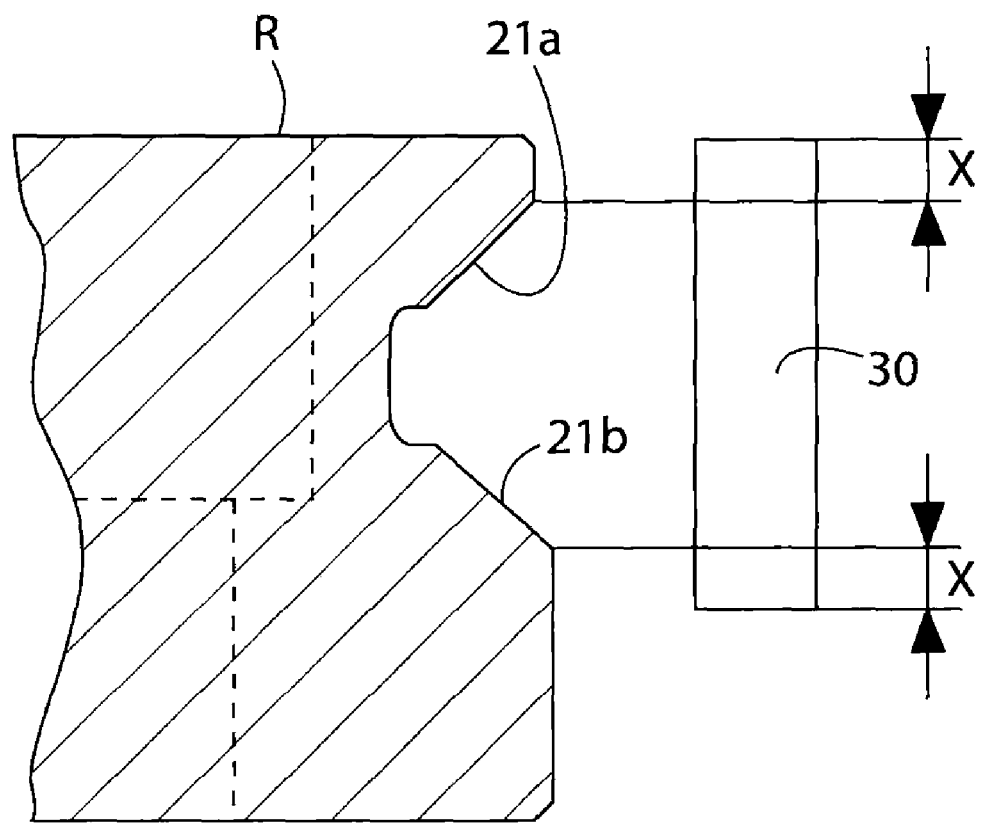
FIG. 8 is a partial sectional view illustrating the relative positional relationship of the impregnation holding member and raceway faces of a rail in the first to fourth embodiments.

Each of the impregnation holding members 30 mounted in the embedding portions 26e is designed to maintain the relative positional relationship with the rail R as illustrated in FIG. 8.

Specifically, when each of the impregnation holding members 30 is placed in the embedding portion 26e, the length of the impregnation holding member 30 is longer than the distance between the upper and lower raceway faces 21a, 21b on each side of the rail R. More specifically, the impregnation holding member 30 is longer by x in length beyond each of the upper and lower sides of the respective upper and lower raceway faces 21a and 21b as illustrated in FIG. 8. However, if the impregnation holding member 30 retains a length exactly equal to the distance between the upper and lower raceway faces 21a and 21b, there may be no need to provide the additional length x. However, when the accuracies of dimensions or assembling of the parts, and the like are taken into account, the provision of the additional length x is an advantage. In any case, the additional length x is not required to be equal at each end of each of the impregnation holding members 30.

Since each of the impregnation holding members 30 maintains the position with respect to the raceway faces 21a, 21b as described above, even when the rail R is fixed to a horizontal surface, a tilted surface, a vertical surface or a ceiling, the impregnation holding member 30 faces the raceway faces 21a, 21b at all times. Such a position of the impregnation holding member 30 always facing the raceway faces 21a, 21b eliminates uneven distribution of the lubricant stored in the embedding portion 26e, making it possible to maintain the effective lubricating capability of the lubricating member A for a longer time-period.

Figure 9:
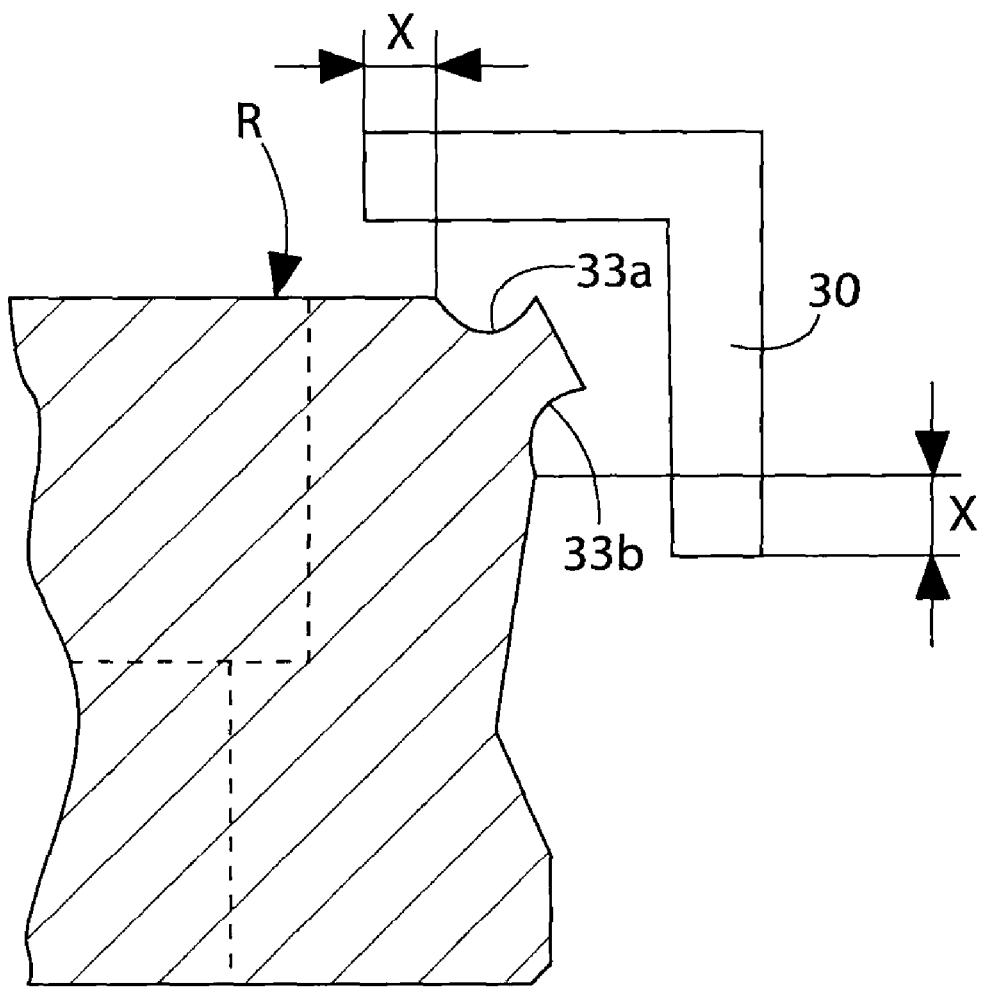
FIG. 9 is a partial sectional view illustrating the relative positional relationship of the impregnation holding member and raceway faces of a rail in a fifth embodiment.

FIG. 9 illustrates a fifth embodiment, in which raceway grooves 33a, 33b corresponding to the raceway sections of the present invention are provided on the rail R, and the balls (not shown) rotatably contained in the slider S roll in the raceway grooves 33a, 33b. In this case, the raceway grooves 33a, 33b are respectively located on opposite sides of each of the upper side corners of the rail R as shown in FIG. 9.

This involves the necessity of forming each of the impregnation holding members 30 in the fifth embodiment into a shape having a 90-degree bend in such a manner as to completely cover the raceway grooves 33a, 33b on each side of the rail R. When the impregnation holding member 30 is formed in such a shape with a 90-degree bend, it goes without saying that the embedding portion 26e of the member body 26 must be also formed in a shape having a 90-degree bend so as to extend between a point of the coupling portion 26a and a point of each side portion 26b of the member body 26.

The fifth embodiment has described the impregnation holding member 30 formed in a shape with a 90-degree bend, but it goes without saying that the impregnation holding member 30 may be formed in a C shape, for example.

In any case, in order for the impregnation holding member 30 to completely cover both the raceway grooves 33a, 33b, the impregnation holding member 30 advantageously has a length extending longer by x beyond the position of each of the raceway grooves as illustrated in FIG. 8.

Each of the aforementioned embodiments has described the correlation between a raceway section of the rail R and an impregnation holding member 30 in relation to the length of the impregnation holding member 30 with respect to the raceway section, but the same holds true with regard to the correlation between a raceway section of the rail R and an embedding portion. This is because the lubricant impregnating the impregnation holding member 30 seeps into the embedding portion 26e and then is absorbed into the member body 26.

In this manner, from the point of view of the relationship of the relative positions of the embedding portion 26e and the raceway section, what is required in terms of structure is that the embedding portion 26e has at least a part always located at a high position, and also the position of this higher-positioned part is maintained at a level equal to or higher than the level of at least a part of one of the raceway sections of the rail R which is located at a higher level relative to the other raceway section.

What is claimed is:

1. A lubricating member for a linear motion rolling guide unit, comprising:

a lubricating member body straddling a rail having a pair of opposing side faces, each opposing side face of the rail having a raceway section formed with a pair of mutually facing raceway surfaces, wherein the member body is capable of being impregnated with lubricant and comprises a pair of mutually facing side portions and a coupling portion connecting each of the side portions to each other, the side portions and the coupling portion being molded in one piece, wherein each of the side portions of the member body is structured and arranged to make contact with a respective one of the pair of mutually facing raceway faces of the raceway sections provided on each of the opposing side faces of the rail when the member body straddles the rail;

a pair of embedding portions, each embedding portion forming either a recess or a hole in a respective side portion of the member body; and a pair of impregnation holding members, each impregnation holding member is embedded in the embedding portion of a respective side portion of the member body, is capable of being impregnated with a greater amount of lubricant per unit volume than the member body is, and has a force sucking the lubricant equal to or smaller than that of the member body, so that each impregnation holding member stores the lubricant and the lubricating member supplies the impregnating lubricant onto raceway faces of the rail while making contact with the raceway faces, wherein each impregnation holding member and the embedding portion in which it is embedded are structured and arranged to form a gap between them, the gap constituting an oil reservoir;

said lubricating member including oil holes through which lubricant can be individually supplied directly to respective embedding portions; and wherein each embedding portion provided in a respective side portion of the member body has a length that is greater than the distance between the pair of mutually facing raceway faces contacted by the respective side portion.

2. A slider for a linear motion rolling guide unit, comprising:

a casing having opposing ends;

a pair of end caps respectively fixed to the opposing ends of the casing;

endless circulating passages provided within the casing and the end caps for holding rolling elements which allow the rolling elements to roll through the endless circulating passages; and a lubricating member mounted on either one or each of the end caps for introduction of a lubricant, the lubricating member comprising a lubricating member body straddling a rail having a pair of opposing side faces, each opposing side face of the rail having a raceway section formed with a pair of mutually facing raceway surfaces, wherein the member body is capable of being impregnated with lubricant and comprises a pair of mutually facing side portions and a coupling portion connecting each of the side portions to each other, the side portions and the coupling portion being molded in one piece, wherein each of the side portions of the member body is structured and arranged to make contact with a respective one of the pair of mutually facing raceway faces of the raceway sections provided on each of the opposing side faces of the rail when the member body straddles the rail;

a pair of embedding portions each embedding portion forming either a recess or a hole in a respective side portion of the member body, and a pair of impregnation holding members, each impregnation holding member is embedded in the embedding portion of a respective side portion of the member body, is capable of being impregnated with a greater amount of lubricant per unit volume than the member body is, and has a force sucking the lubricant equal to or smaller than that of the member body, so that each impregnation holding member is impregnated with a lubricant and the member body supplies the impregnating lubricant onto the raceway sections of the rail while making contact with the raceway sections, wherein each impregnation holding member and the embedding portion in which it is embedded are structured and arranged to form a gap between them, the gap constituting an oil reservoir;

said lubricating member including oil holes through which lubricant can be individually supplied directly to respective embedding portions; and wherein each embedding portion provided in a respective side portion of the member body has a length that is greater than the distance between the pair of mutually facing raceway faces contacted by the respective side portion.

3. The slider for a linear motion rolling guide unit according to claim 2, wherein a core plate having approximately the same shape as that of the member body is attached to an outer end of the end cap, a packing plate is interposed between the core plate and the member body, the member body is covered by a case, an end face seal is overlaid on an outer end face of the case, and the oiling holes are formed to extend through the end face seal and the case to reach the embedding portion.

* * * * *